(12) United States Patent
Han et al.

(10) Patent No.: US 7,853,072 B2
(45) Date of Patent: Dec. 14, 2010

(54) SYSTEM AND METHOD FOR DETECTING STILL OBJECTS IN IMAGES

(75) Inventors: Feng Han, Lawrenceville, NJ (US); Ying Shan, Sammamish, WA (US); Ryan Cekander, Plainsboro, NJ (US); Harpreet S. Sawhney, West Windsor, NJ (US); Rakesh Kumar, Monmouth Junction, NJ (US)

(73) Assignee: Sarnoff Corporation, Princeton, NJ (US)

( * ) Notice: Subject to any disclaimer, the term of this patent is extended or adjusted under 35 U.S.C. 154(b) by 816 days.

(21) Appl. No.: 11/780,109

(22) Filed: Jul. 19, 2007

(65) Prior Publication Data

US 2008/0025568 A1  Jan. 31, 2008

Related U.S. Application Data

(60) Provisional application No. 60/832,033, filed on Jul. 20, 2006.

(51) Int. Cl.
*G06K 9/62* (2006.01)

(52) U.S. Cl. .................. 382/155; 382/103; 382/168; 382/195

(58) Field of Classification Search .................. 382/103, 382/155–159, 168–170, 195–197
See application file for complete search history.

(56) References Cited

U.S. PATENT DOCUMENTS 5,101,440 A * 3/1992 Watanabe et al. ........... 382/168
5,604,822 A * 2/1997 Pearson et al. ............. 382/199
5,644,386 A * 7/1997 Jenkins et al. ............. 356/4.01
7,688,997 B2 * 3/2010 Gibbins et al. ............. 382/103
2007/0098254 A1 * 5/2007 Yang et al. ................. 382/159
2007/0237387 A1 * 10/2007 Avidan et al. ............... 382/159

OTHER PUBLICATIONS

Viola and Jones, Rapid object detection using a boosted cascade of simple features, Proc. 2001 IEEE Computer Soc'y Conf.—Computer Vision & Pattern Recognition 511-18 (2001).
Kuehnle, Symmetry-based recognition of vehicle rears, Pattern Recognition Letters 12:4, 249-58 (1991).
Mallot et al., Inverse perspective mapping simplifies optical flow computation and obstacle detection, Biol. Cybernetics 64:3, 177-85 (1991).
Bertozzi et al., Gold: A parallel real-time stereo vision system for generic obstacle and lane detection, IEEE Transactions on Image Processing 7:1, 62-81 (1998).

(Continued)

*Primary Examiner*—Manav Seth
(74) *Attorney, Agent, or Firm*—Lowenstein Sandler PC

(57) ABSTRACT

The present invention provides an improved system and method for object detection with histogram of oriented gradient (HOG) based support vector machine (SVM). Specifically, the system provides a computational framework to stably detect still or not moving objects over a wide range of viewpoints. The framework includes providing a sensor input of images which are received by the "focus of attention" mechanism to identify the regions in the image that potentially contain the target objects. These regions are further computed to generate hypothesized objects, specifically generating selected regions containing the target object hypothesis with respect to their positions. Thereafter, these selected regions are verified by an extended HOG-based SVM classifier to generate the detected objects.

12 Claims, 12 Drawing Sheets

OTHER PUBLICATIONS

Heisele and Ritter, Obstacle detection based on color blob flow, Proc. IEEE Intelligent Vehicles Symp., 282-86 (1995).

Koller et al., Algorithm characterization of vehicle trajectories from image sequences by motion verbs, Proc. 1991 IEEE Computer Soc'y Conf. Computer Vision & Pattern Recognition 90-95 (1991).

Weber et al., Unsupervised learning of models for recognition, Lecture Notes in Computer Sci. Computer Vision Euro. Conf. Computer Vision 1842, 18-32 (2000).

Sung and Poggio, Example-based learning for view-based human face detection, IEEE Transactions on Pattern Analysis & Machine Intelligence 20:1, 39-51 (1998).

van der Wal et al., The Acadia vision processor, Proc. 5th IEEE Int'l Workshop on Computer Architectures for Machine Perception 31-40 (2000).

Lowe, Distinctive image features from scale-invariant keypoints, Int'l J. Computer Vision 60:2, 91-110 (2004).

Osuna et al., Training support vector machines: an application to face detection, Proc. 1997 IEEE Computer Soc'y Conf. Computer Vision & Pattern Recognition 130-36 (1997).

Vapnik, The Nature of Statistical Learning Theory, 139-169 (2d ed. 2000).

Agarwal et al., Learning to detect objects in images via a sparse, part-based representation, IEEE Transactions on Pattern Analysis & Machine Intelligence 26:11, 1475-1490 (2004).

Zielke et al., Intensity and edge-based symmetry detection with an application to car following, CVGIP: Image Understanding 58, 177-90 (1993).

Viola et al., Detecting pedestrians using patterns of motion and appearance, Int'l J. Computer Vision 63:2, 153-61 (2005).

Agarwal and Roth, Learning a sparse representation for object detection, Proc. 7th Euro. Conf. Computer Vision 1, 113-30 (2002).

Leibe et al., Pedestrian detection in crowded scenes, IEEE Computer Soc'y Conf. Computer Vision and Recognition 1, 878-85 (2005).

Leibe et al., Combined object categorization and segmentation with an implicit shape model, Euro. Conf. Computer Vision Works. on Statistical Learning in Computer Vision, 17-32 (2004).

Dalal and Triggs, Histograms of oriented gradients for human detection, IEEE Computer Soc'y Conf. Computer Vision and Recognition 1, 886-93 (2005).

Belongie et al., Shape matching and object recognition using shape contexts, IEEE Transactions on Pattern Analysis & Machine Intelligence 24:4, 502-22 (2002).

Freeman and Roth, Orientation histograms for hand gesture recognition, IEEE Intl. Works. on Automatic Face and Gesture Recognition, 296-301 (1995).

Freeman et al., Computer vision for computer games, Proc. 2d Int'l Conf. Automatic Face and Gesture Recognition, 100-105 (1996).

Heisele et al, Hierarchical classification and feature reduction for fast face detection with support vector machines, Pattern Recognition 36, 2007-17 (2003).

Romdhani et al., Computationally efficient face detection, Proc. 8th Int'l Conf. on Computer Vision 1, 695-700 (2001).

Everingham et al., The 2005 pascal visual object classes challenge, Proc. 1st PASCAL Challenges Works. (2005).

Shan et al., Learning Exemplar-Based Categorization for the Detection of Multi-View Multi-Pose Objects, Proc. 2006 IEEE Computer Soc'y Conf. Computer Vision & Pattern Recognition 2, 1431-38 (2006).

\* cited by examiner

SYSTEM AND METHOD FOR DETECTING STILL OBJECTS IN IMAGES

CROSS-REFERENCE TO RELATED APPLICATIONS

This application claims the benefit of U.S. Provisional Patent Application No. 60/832,033 filed Jul. 20, 2006, the entire disclosure of which is incorporated herein by reference.

GOVERNMENT RIGHTS IN THIS INVENTION

This invention was made with U.S. government support under contract number NBCHC050078. The U.S. government has certain rights in this invention.

FIELD OF THE INVENTION

The invention relates generally to multi-view multi-pose objects detection system. More specifically, the invention relates to a system and method for providing a novel computational framework for detecting still or not moving objects over a range of viewpoints in a static image.

BACKGROUND OF THE INVENTION

Automatic object detection and classification is a key enabler for applications in robotics, navigation, surveillance, or automated personal assistance. Yet, an automatic object detection is a difficult task. The main challenge is the amount of variation in visual appearance. An object detector must cope with both the variation within the object category and with the diversity of visual imagery that exists in the world at large. For example, cars vary in size, shape, color, and in small details such as the headlights, bumpers, tires etc. The lighting, surrounding scenery, and an object's pose affects its appearance. A car detection algorithm must also distinguish cars from all other visual patterns that may occur in the world, such as similar looking rectangular objects.

The common approach to automatic object detection is shifting a search window over an input image and categorizing the object in the window with a classifier. To speed up the system with losing classification performance, one can exploit the following two characteristics common to most vision-based detection tasks. First, the vast majority of the analyzed patterns in an image belong to the background class. For example, the ration of non-face to face patterns is about 50,000 to 1. These tests are done by P. Viola and M. Jones in "Rapid object detection using a boosted cascade of simple features". In Proc. CVPR, pages 511-518. Second, many of the background patterns can be easily distinguished from the objects. Based on these two observations, object detection is always carried out in a two-stage scheme as illustrated in the block diagram of the system 100 in FIG. 1. First, all the regions in the image that potentially contain the target objects are identified. This is what is known as "focus of attention's mechanism". Second, the selected regions are verified by a classifier.

Various focus of attention generation approaches have been proposed in the literature, each of which falls into one of the following three categories known as the knowledge-based, stereo-based, and motion-based. Knowledge-based methods employ knowledge about object shape and color as well as general information about the environment. For example, symmetry detection approaches using the intensity or edge map have been exploited based on the observation that vehicles are symmetric about the vertical axis. This is clearly disclosed by A. Kuehnle in "Symmetry-based recognition for vehicle rears," *Pattern Recognition Letters*, vol. 12, pp. 249-258. Stereo-based approaches usually take advantage of the inverse perspective mapping (IMP) to estimate the locations of vehicles, people, and obstacles in images. The IMP approach is described by H. Mallot, H. Bulthoff, J. Little, and S. Bohrer in "Inverse perspective mapping simplifies optical flow computation and obstacle detection," *Biological Cybernetics*, vol. 64, no. 3, pp. 177-185. Furthermore, Bertozzi et al, in "Gold: A parallel real-time stereo vision system for generic obstacle and lane detection," *IEEE Trans. on Image Processing*, vol. 7, pp. 62-81, computed the IMP from the left and right images and compared the two images. Based on the comparison, one could find objects that were not on the ground plane. Using this information, one was able to determine the free space in the scene. Motion-based methods detect vehicles, people, and obstacles using optical flow. Generating a displacement vector for each pixel (continuous approach), however, is time-consuming and also impractical for a real-time system. In contrast to continuous methods, discrete methods reported better results using image features such as color blobs or local intensity minima and maxima. The method using color blobs is disclosed by B. Heisele and W. Ritter in "Obstacle detection based on color blob flow," *IEEE Intelligent Vehicles Symposium*, pp. 282-286. The method using local intensity mimima and maxima is disclosed by D. Koller, N. Heinze and H. Nagel in "Algorithm characterization of vehicle trajectories from image sequences by motion verbs," *IEEE Conf. on Computer Vision and Pattern Recognition*, pp. 90-95.

A number of different approaches to hypothesis verification that use some form of learning have been proposed in the literature. In these approaches, the characteristics of the object class are learned from a set of training images which should capture the intra-class variabilities. Usually, the variability of the non-object class is also modeled to improve performances. First, each training image is represented by a set of local or global features (e.g. Harr wavelet, SIFT, Shape Context) as described by P. Viola and M. Jones in "Rapid object detection using a boosted cascade of simple features". In Proc. CVPR, pages 511-518. Then these features are converted into some underlying configuration (e.g. "bag of features", constellation model) as disclosed by M. Weber, M. Welling, and P. Perona in "Unsupervised learning of models for recognition", In Proc. ECCV, pages 18-32. Then, the decision boundary between the object and non-object classes is learned either by training a classifier (e.g., Adaboost, Support Vector Machine, Neural Network (NN) or by modeling the probability distribution of the features in each class (e.g., using Bayes rule assuming Gaussian distributions). These methods differ on the details of the features and decision functions, but more fundamentally they differ in how strictly the geometry of the configuration of parts constituting an object class is constrained. So, a need exists in the art to built an improved system which stably detects still or not moving objects over a wide range of viewpoints.

SUMMARY OF THE INVENTION

In one embodiment of the present invention there is provided a method for detecting at least one still target object in at least one image. The method comprising the step of receiving a dataset of training samples. The training samples including images of the still target object. The method also comprising the step of selecting regions in the training samples potentially having the still target object and computing an extended histogram of oriented gradient (HOG) feature in an image patch of the selected region to generate an angle dimension and a distance dimension of each pixel in said image patch. The method further comprising the step of training at least one classifier based on the computed extended HOG feature to detect the still target object to said image patch.

Furthermore, there is provided a computer program product comprising computer readable storage medium having a computer program stored thereon for performing the method described above.

DETAILED DESCRIPTION OF THE INVENTION

Figure 2:
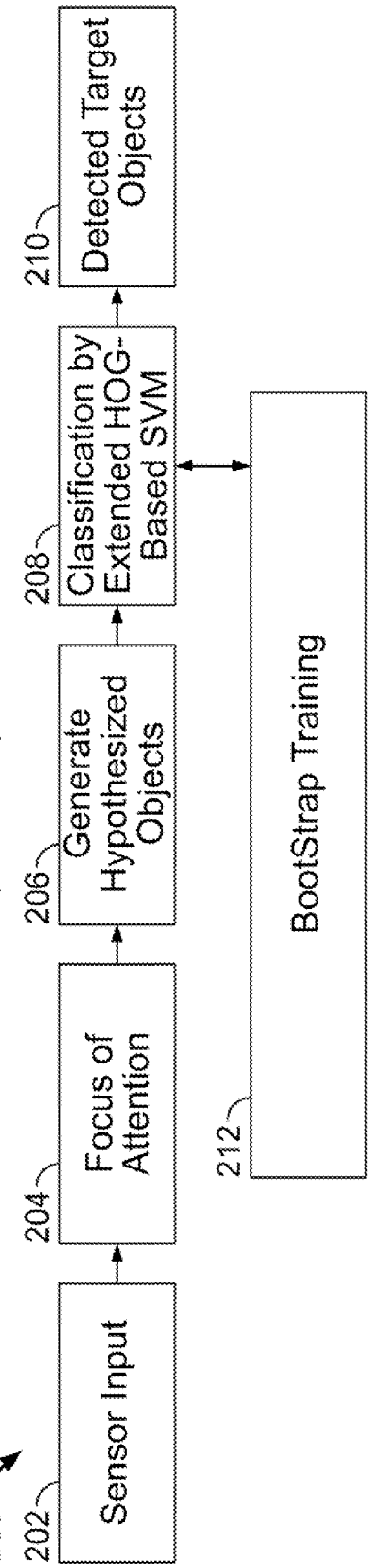
FIG. 2 illustrates a block diagram of a system for object detection in accordance with an embodiment of the present invention.

Following the two-stage paradigm discussed above, the present invention provides a block diagram of an improved system 200 as illustrated in FIG. 2 for object detection. More specifically, the system 200 provides a computational framework to stably detect still or not moving objects over a wide range of viewpoints. The framework 200 includes providing a sensor input 202 of images which are received by the "focus of attention" mechanism 204 to identify the regions in the image that potentially contain the target objects. These regions are further computed to generate hypothesized objects 206, specifically generating selected regions containing the target object hypothesis with respect to their positions. Thereafter, these selected regions are verified by an extended HOB-based SVM classifier 208 to generate the detected objects 210. The HOG-based SVM classifier 208 is trained via a known bootstrap training process 212 as described by Sung and Poggio in "Example-based learning for view-based human face detection", *IEEE Transaction on Pattern Analysis and Machine Intelligence*, Vol. 20, no. 1, pp. 39-51. The details of each of the elements of FIG. 2 are provided in greater detail herein below.

I. Focus of Attention Using Stereo Cue (Image)

Figure 3:
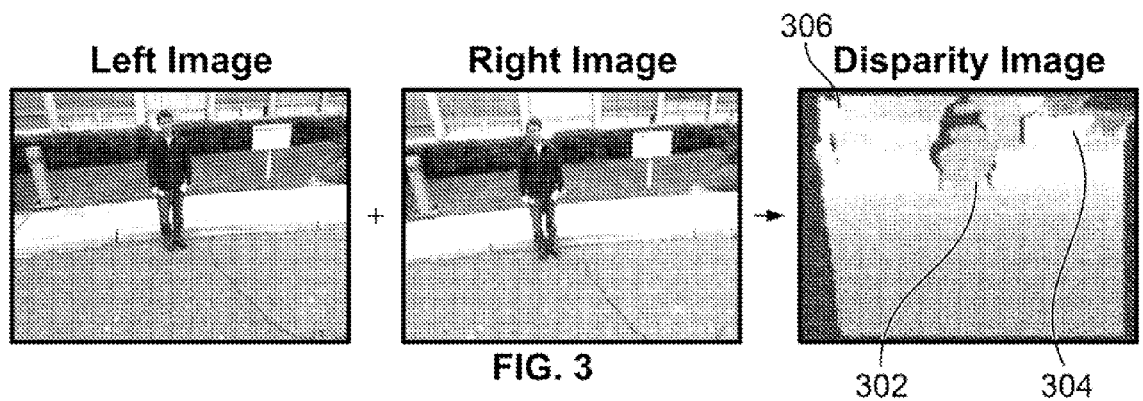
FIG. 3 illustrates a stereo pair image and the depth map computed from this stereo pair in accordance with the present invention.
Figure 4:
FIG. 4 illustrates views/poses of a human as an exemplary object to model in accordance with a preferred embodiment of the present invention.
Figure 5:
FIG. 5 illustrates views/poses of a vehicle as an exemplary object to model in accordance with an alternate embodiment of the present invention.

Referring to FIG. 4, there is shown exemplary pair of left and right images of a standing person generated by a sensor input 202. To generate a focus of attention 204 for the target objects in the scene, a depth map (disparity image) of the scene is computed using a stereo matching algorithm as disclosed by G. van der Wal and M. Hansen and M. Piacentino in "The Acadia Vision Processor", *International Workshop on Computer Architectures for Machine Perception*. The depth map is computed from this stereo pair image in FIG. 3. In the depth map, region 302 implies closer points to the target object and regions 304 and 306 imply to further points from the target object.

After obtaining the depth map of the scene in FIG. 3, it is further aligned with the ground plane with the help of the inertial measurement unit (IMU) attached with the stereo system (not shown) provided by the stereo input 202, which also provides the pitch angle. Then the ground plane from the depth map is removed. The remaining depth map, is projected to the XZ plane and represents it with a uniform grid. For each cell in this grid, the height and pixel density is computed to obtain the "height map" and "occupancy map" as illustrated in FIG. 3 ($a$) and ($b$) respectively. Then, the response of a predefined adaptive Gaussian kernel on the "occupant map" is computed. The Gaussian kernel is known as the function, $(2PI)^{-.5} \exp(-u^2/2)$, where $u=(x-x_i)/h$, h is the window width and $x_i$ are the values of the independent variable in the data, and x is the value of the independent variable for which one seeks an estimate.

Figures 3A, 3B:
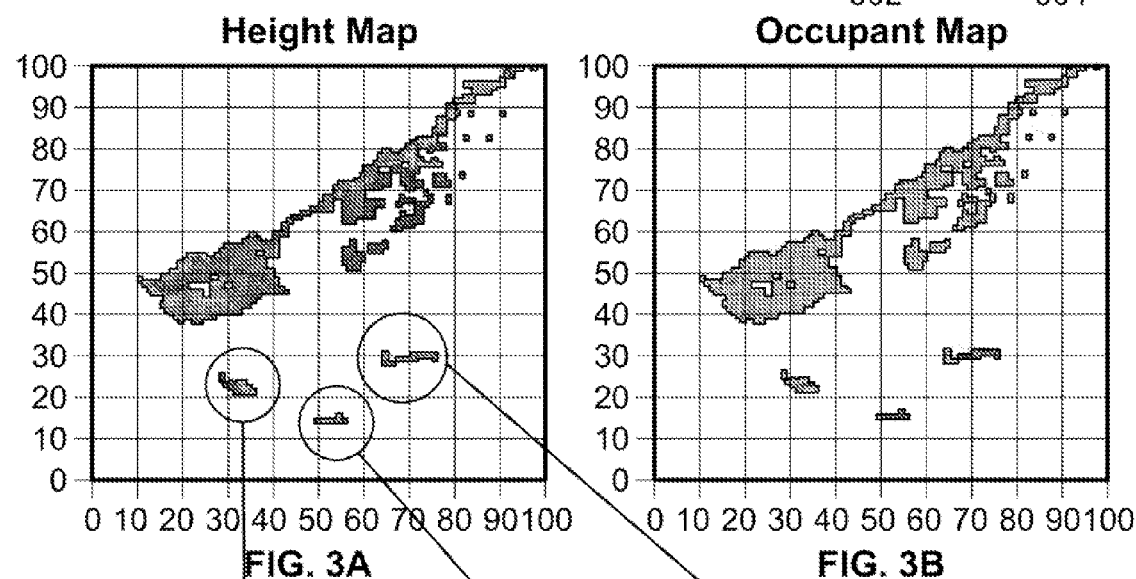
FIG. 3A and FIG. 3B illustrates a height map and occupancy map respectively based on the depth map of FIG. 3 in accordance with present invention.
Figure 3C:
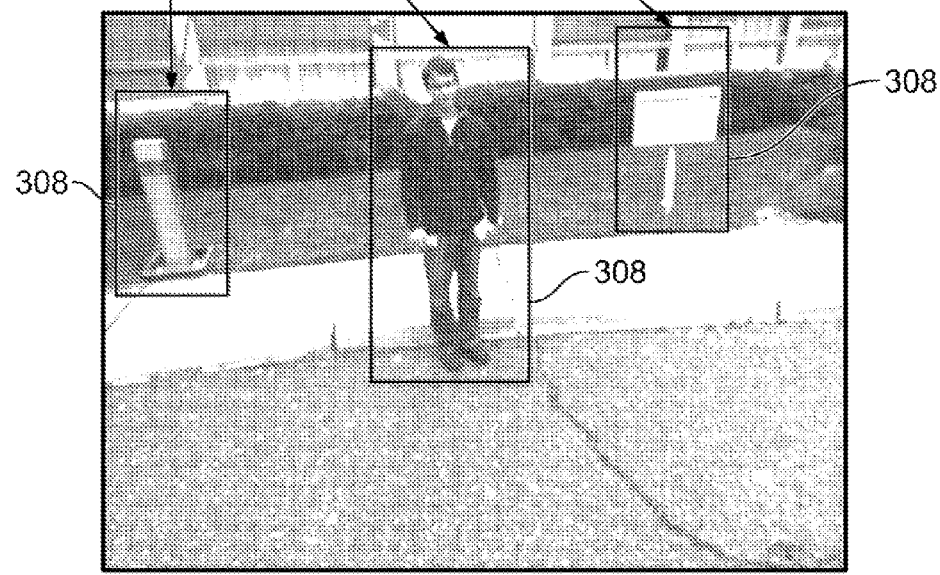
FIG. 3C shows a target object position hypothesis on the image based on the height map and occupancy map of FIGS. 3A and 3B respectively.

Finally, the peaks with local maximum response are selected as the target object position hypothesis. An example result of this process is shown in FIG. 3C which generates target position hypothesis 206 based on the height and occupancy map of FIGS. 3A and 3B respectively. Note that the gaussian algorithm as described above has detected relatively compact vertical objects as shown in by the rectangular windows 308 in FIG. 3C. These compact vertical objects are identified as the candidate regions/objects in the image.

II. Classification by HOG-Based SVM

Separate classifiers are developed or trained for each candidate object class that are each specialized to one specific aspect or pose. For example, one classifier is preferably specialized to front/rear view of a person and another classifier is preferably specialized to side view of a person. These view-pose-based classifiers are applied in parallel and then their results are combined. If there are multiple detections at the same or adjacent locations, the system selects the most likely one through non-maximum suppression, i.e. that edges are defined as points where the gradient magnitude assumes a maximum in the gradient direction. So, for example, in an image with an exemplary NXN window, (N can be any number except zero), each pixel in that window has one value. To find a local maximum for each current pixel in the window, one obtains the gradient value of all of the neighboring pixels. If the value of the neighboring pixel is bigger than the current pixel, then the current pixel is removed or if the value of the current pixel is larger than its neighbor, then the neighboring pixel is removed. Thus, with this approach very few pixels remain which are selected to have the maximum scope.

Initially, the number of views/poses to model for each candidate object are empirically determined. For people, two view-based detectors are preferably used, for example, front/rear and side view, as shown in FIG. 4. For vehicles, eight detectors are preferably used, which are specialized in orientation, but is trained to find the position of the object only at a specified size within the rectangular image windows 308 of FIG. 3C. Therefore, to be able to detect the object at any position within an image, the detectors are reapplied for all possible positions of this rectangular window. Then to be able to detect the object at any size, the input image is iteratively resized and the detectors are reapplied in the same fashion to each resized image.

To build each view-pose-based classifier, a histogram of oriented gradient (HOG) representation is extended and support vector machines (SVM) are used as the classifier 208. Unlike some commonly used representations, the extended histogram of oriented gradient (HOG) gives good generalization by grouping only perceptually similar images together. With a support vector machine (SVM), this gives rise to a decision function that discriminates object and non-object patterns reliably in images under different kinds of conditions and results good performance on some challenging datasets. The details of the HOG, extended HOG and the SVM is provided herein below.

A. Object Class Representation

Figure 6:
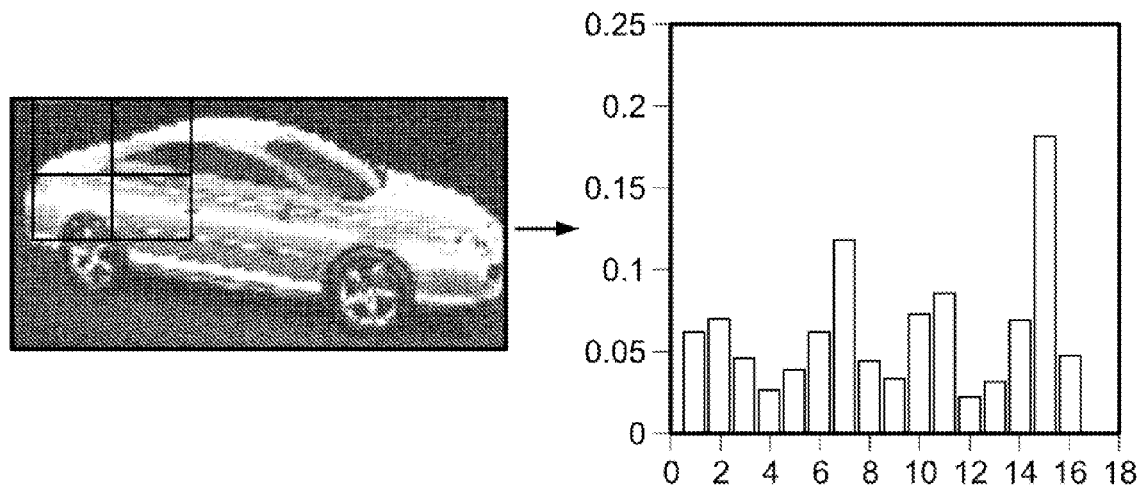
FIG. 6 illustrates a conventional computation of a histogram of oriented gradient (HOG) computation and structure of a vehicle.

Histogram of oriented gradient (HOG) is well-known technique of an adaptation of Lowe's Scale Invariant Feature Transformation (SIFT) approach to wide baseline image matching with local spatial histogramming and normalization. This SIFT approach is described by D. Lowe in "Distinctive image features from scale-invariant keypoints", *International Journal of Computer Vision*, 60(2):91-110. In this work, HOG is used to provide the underlying image patch descriptor as shown in FIG. 6a for matching scale invariant key points. SIFT-style approaches perform remarkably well in this application. A HOG feature is created by first computing the gradient magnitude and orientation at each image sample point in an image patch of the region around an anchor point. The region is split into N×N subregions. In FIG. 6a, there is shown an example of 4×4 subregions. An orientation histogram for each subregion is then formed by accumulating samples within the subregion, weighted by gradient magnitudes and binned together into a histogram. Concatenating the histograms from all the subregions gives the final HOG feature vector as illustrated in FIG. 6b.

Figure 7:
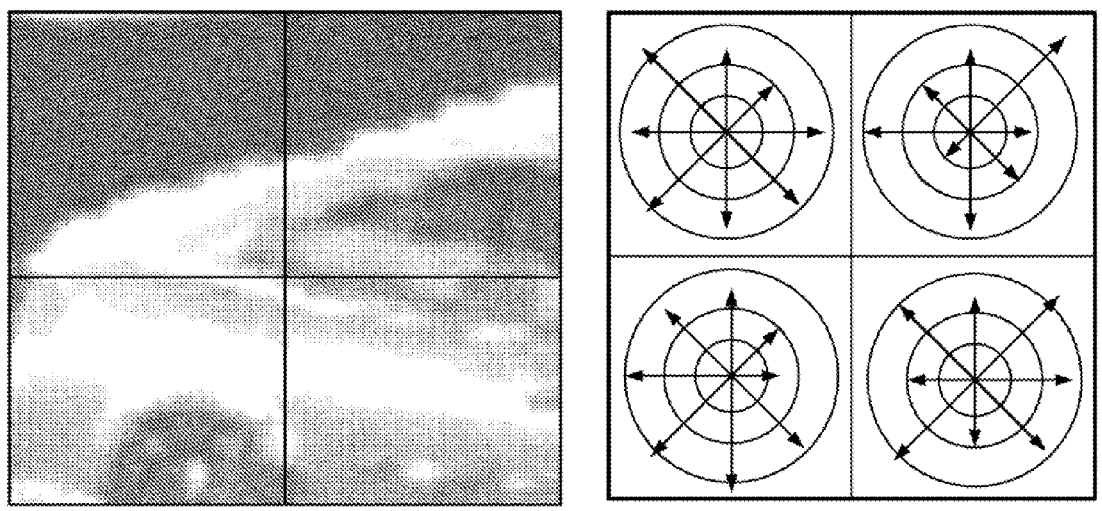
FIG. 7 illustrates a novel computation of histogram of oriented gradient (HOG) computation and structure of a vehicle with a binning process in one embodiment of the present invention.

As discussed above, the standard HOG feature only encodes the gradient orientation of one image patch, no matter where this orientation is from in this patch. Therefore, it is not discriminative enough if the spatial property of the underlying structure of the image patch is crucial. This is especially true for highly structured objects like vehicles. Thus, the standard HOG is extended to incorporate the spatial property in HOG feature as shown in the new binning process computation and structure of FIGS. 7a and 7b respectively. This is achieved by adding at least one distance dimension (illustrated by the circles in FIG. 7b) to the angle dimension (illustrated by the arrows in FIG. 7b) in the binning of all the pixels within each sub-region. The distance is relative to the center of each sub-region. Thus, the histogram is computed using both the orientation and the position of the image patch to provide more discriminative features in order to differentiate objects from the non-objects. So, both the orientation and the distance values of all the pixels are binned into a 2D orientation histogram including the horizontal axis preferably having the angle value and the vertical axis preferably having the distance value.

After computing the extended HOG feature as described above a dense grid representation of the image window may preferably be obtained. The image window is divided into small spatial regions, which consists of a number of subregions (or cells). For each cell, a local 1-D histogram of gradient directions over the pixels of the cell is accumulated. The combined histogram entries from the representation. For better invariance to illumination, shadowing, etc., it is also useful to contrast-normalize the local responses before using them. This can be done by accumulating a measure of local histogram over somewhat larger spatial regions (or blocks) and using the results to normalize all of the cells in the block.

B. SVM Classifier

Furthermore, after computing the extended HOG feature as described above, a classifier is required to be built. The support vector machine (SVM) is preferably selected as the classifying function of the classifier 208. The SVM classifier is described by E. Osuna, R. Freund, and F. Girosi in "Training support vector machines: an application to face detection," in *Proceedings of the IEEE Conference on Computer Vision and Pattern Recognition*, pages 130-136, and by V. Vapnik in "The nature of statistical learning theory". *New York: Springer-Verlag*, pages 139-169. The Support Vector Machine (SVM) is a statistical learning method based on the structure risk minimization principle. It's efficiency has been proved in many pattern recognition applications as disclosed by E. Osuna, R. Freund, and F. Girosi in "Training support vector machines: an application to face detection," in *Proceedings of the IEEE Conference on Computer Vision and Pattern Recognition*, pages 130-136. In the binary classification case, the objective of the SVM is to find a best separating hyper plane with a maximum margin. The form of a SVM classifier is:

$$y = \text{sign}\left(\sum_{i=1}^{N} y_i \alpha_i K(x, x_i) + b\right)$$

where x is the preferably extended HOG feature vector of an observation example, $y \in \{+1, -1\}$ is a class label, $x_i$ is preferably the extended HOG feature vector of the $i^{th}$ training sample, N is the number of training samples, and $k(x,x_i)$ is the kernel function. Through the learning process, $\alpha = \{\alpha_1, \alpha_2, \ldots, \alpha_N\}$ is computed.

One distinct advantage of this type of classifiers has over traditional neural networks is that support vector machines achieve better generalization performance. While neural networks such as multiple layer perceptrons (MLPs) can produce low error rate on training data, there is no guarantee that this will translate into good performance on test data. Multiple layer perceptrons minimize the mean squared error over the training data (empirical risk minimization), where support vector machines use an additional principla called structural risk minimization as disclosed by E. Osuna, R. Freund, and F. Girosi in "Training support vector machines: an application to face detection," in *Proceedings of the IEEE Conference on Computer Vision and Pattern Recognition*, pages 130-136. The purpose of structural risk minimization is to give an upper bound on the expected generalization error. Compared with the popular Adaboost classifiers, SVM is slower in test stage. However, the training of SVM is much faster than the Adaboost classifiers.

III. Experiments

A. Training

Figure 8:
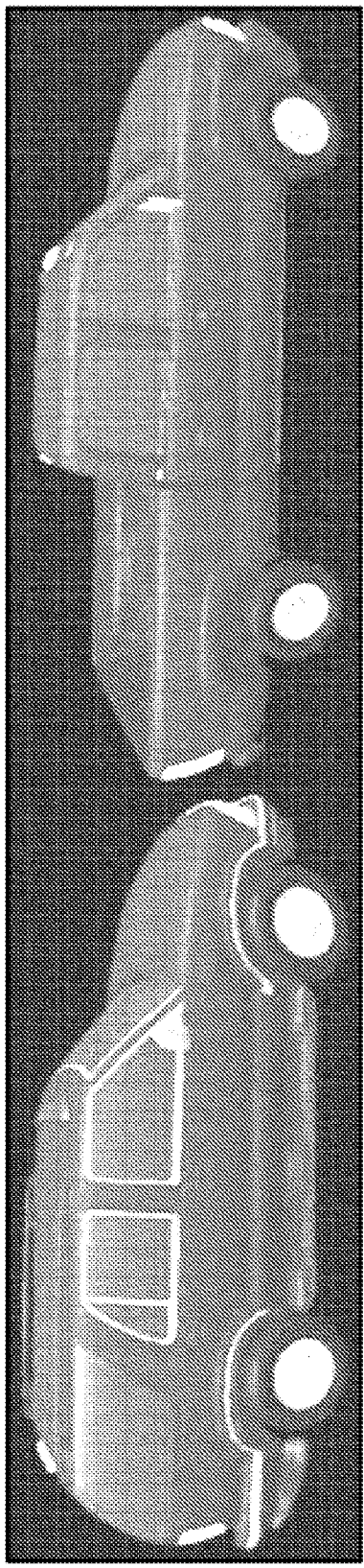
FIG. 8 illustrates samples of rendered 3D vehicle images used as a training data in a preferred embodiment of the present invention.
Figure 10A:
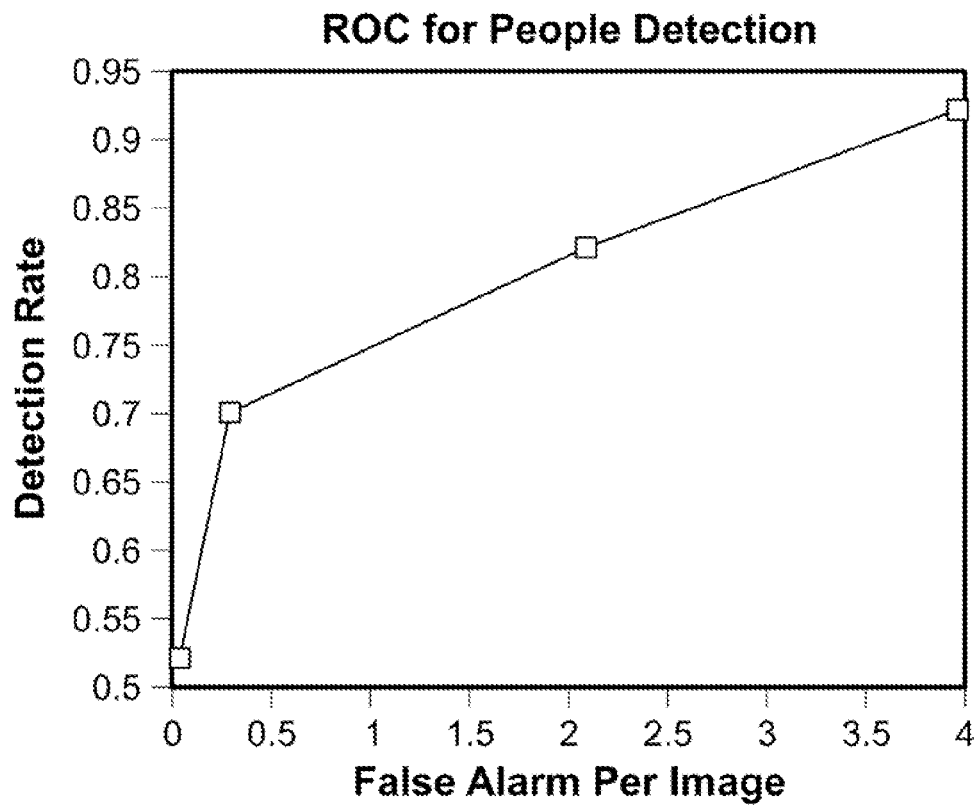
FIG. 10a illustrates a graphical representation of the performance curve for people detection without using stereo cue to generate focus of attention.
Figure 10B:
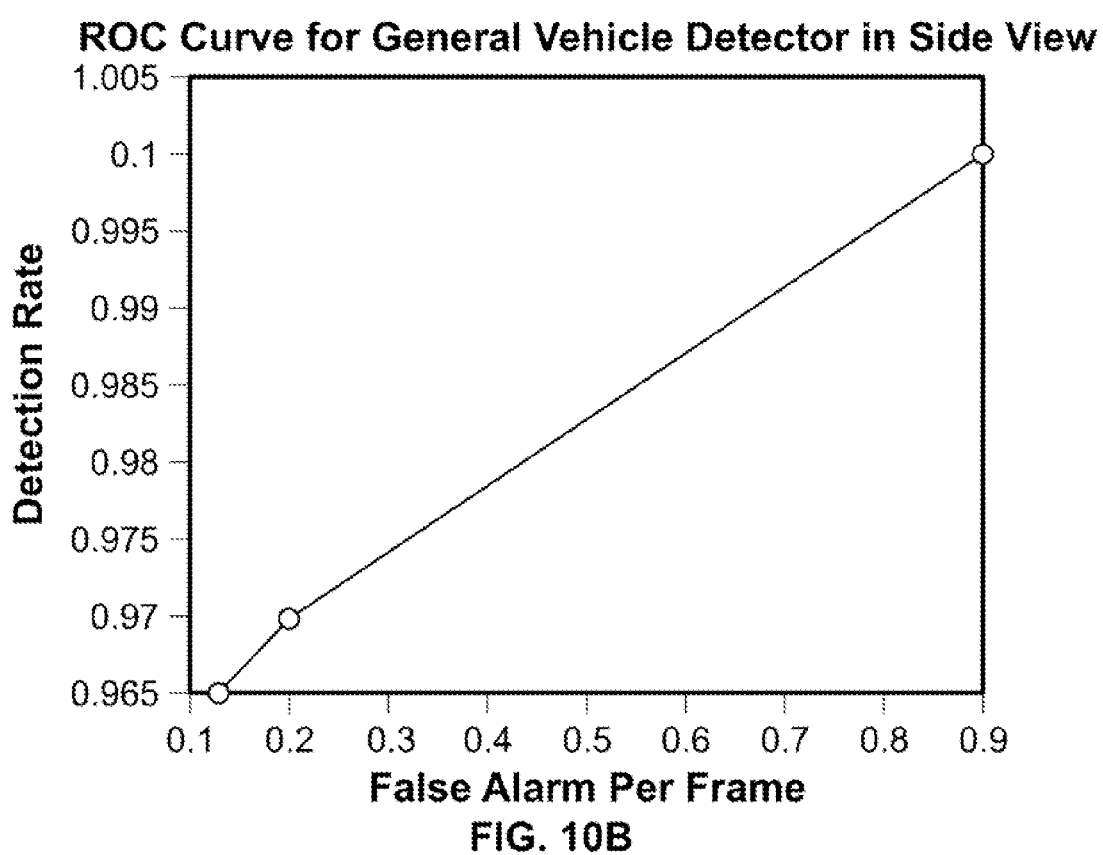
FIG. 10b shows a graphical representation of the performance curve for vehicle detection on UIUC dataset using stereo cue to generate focus of attention.
Figure 10C:
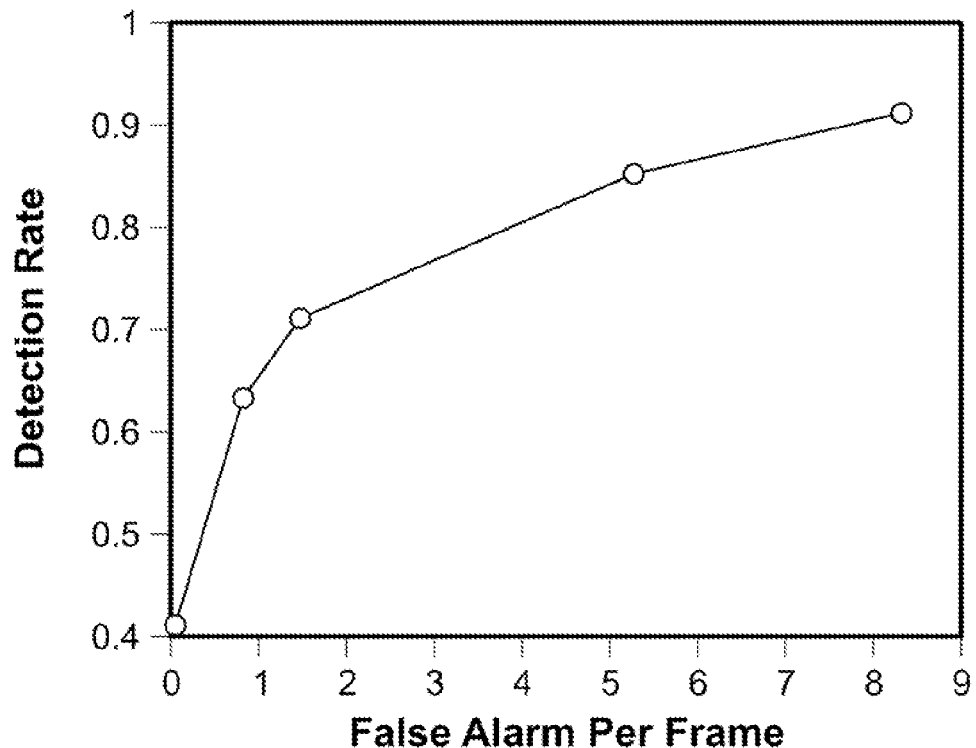
FIG. 10c shows a graphical representation of the performance curve for vehicle detection on PASCAL dataset using stereo cue to generate focus of attention.

The training database (not shown) may contain images of several thousands still objects with various aspects, poses, and illumination conditions. Some of these images are from the public downloadable MIT people dataset and INRIA people dataset, while the rest are taken by individuals. The resolution of each image is preferably 64×128. For the vehicle training data, preferably about 1000 images with 128×64 resolution are collected that include at least four types of vehicles (sedan, minivan/SUV, pick-up truck and U-Haul type truck) across a wide range of viewpoints. Thus, in an alternate embodiment of the present invention, some rendered vehicle images are generated, some of which are shown in FIG. 8, which are 3D vehicle models and used as training data. Using this type of virtual training data is crucial since sometimes it is too time consuming or even impossible to get normal training data covering all possible pose-view variations for some object classes. The performance of vehicle classifier trained using these rendered images is tested and results shown in the graph of FIG. 10e as will be described in greater detail below.

The sensor input 202 provides images of training samples of both positive samples 902 and negative samples 904. The positive sample would preferably contain a target object such as a person or a vehicle, whereas the negative samples would preferably would not contain these target objects. One very important issue in the classifier training for one object class is how to select effective negative training samples. As negative training samples include all kinds of images, a prohibitively large set is needed in order to be representative, which would also require infeasible amount of computation in training. To alleviate this problem, the bootstrap training method 212, is used to incrementally train the classifier 906 as illustrated in detail in FIG. 9. This bootstrap training method is proposed by Sung and Poggio in "Example-based learning for view-based human face detection", *IEEE Transaction on Pattern Analysis and Machine Intelligence*, vol. 20, no. 1, pp. 38-51.

Figure 9:
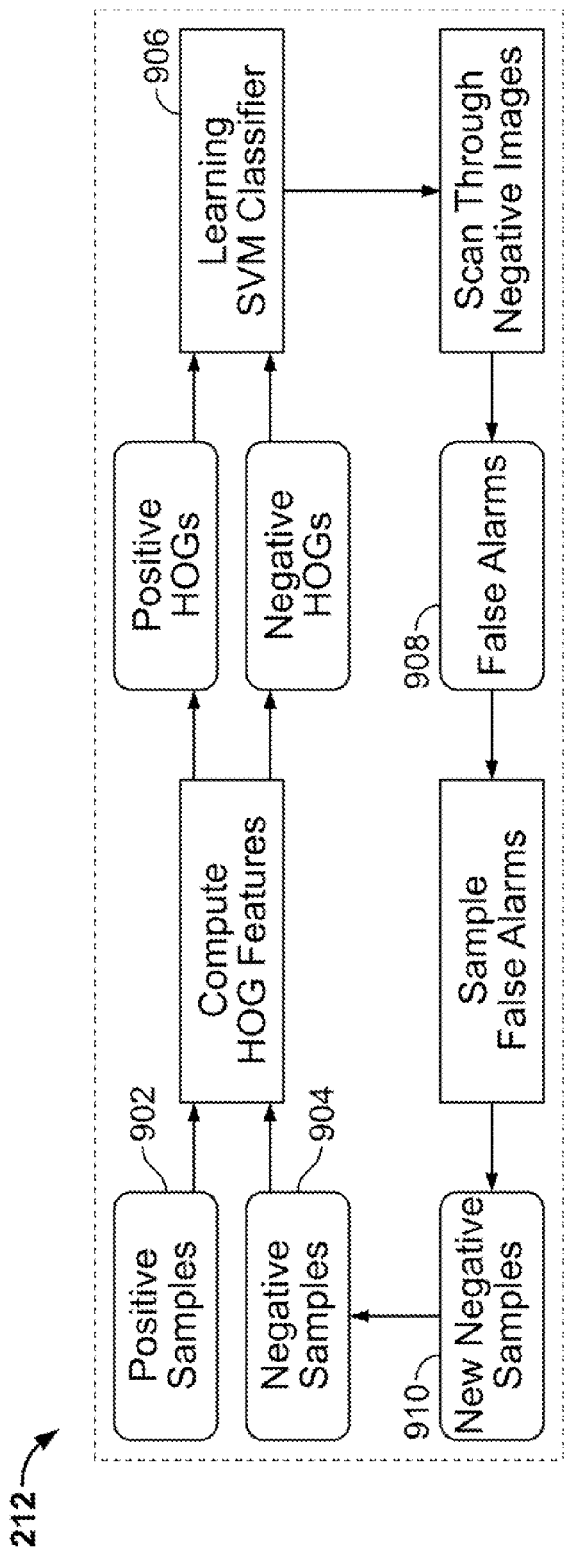
FIG. 9 illustrates a bootstrap training method to train the classifier in accordance with another embodiment of the present invention.

If there is not enough negative training samples 904, the training classifier 906 will produce some false alarms 908 as shown in FIG. 9. The false alarms 908 are inputted into the training data as new negative samples 910 to train the classifier 906. This training is an iterative procedure to make the classifier stronger.

Furthermore, all the view-pose-based SVM classifiers for each candidate object class are trained separately, but with the same negative training samples. In this way, their outputs can compete with each other to remove multiple detections through non-maximum suppression.

B. Detection

After the training of the classifier 208, target objects are detected at 210. As each specific view-pose-based classifier for every object class is designed on an image window 308 with specific size (64×128 for people, 128×64 for vehicle), it implicitly requires that the to-be-detected target objects lie roughly within a specific window 308 in the testing images. Testing images are data used for verifying the classifier. To detect all the objects appearing at different scales in the test image, an image pyramid is built by successively up sampling and/or down sampling the test image by a factor of 1.2 till all the objects in the test image are scaled to the image window size at some layer in the pyramid.

C. Evaluation of Detection Results

Evaluation of detection results was performed using receiver operating characteristic (ROC) curve analysis. ROC curve is a plot of the true positive rate against the false positive rate for the different possible cutpoints of a diagnostic test. The output required to generate such curves is a set of bounding boxes (image windows) with corresponding "confidence" values, with large values indicating high confidence that the detection corresponds to an instance of the object class of interest. FIG. 10 shows some example ROC curves obtained by applying a set of thresholds to the confidence output by the SVM classifier. On the x-axis is plotted the average number of false alarms on one image, i.e. the average number of incorrect detections of non-objects made for each image. On the y-axis is detection rate, i.e. the percent of objects detected. The ROC curve makes it easy to observe the tradeoff between the two i.e. some thresholds may have high detection rate but more false alarms, while other thresholds may give more balanced performance.

To generate the ROC curves, a criteria to evaluate the detection output is required. Judging each detection output by a method as either a true positive (object) of false positive (non-object) requires comparing the corresponding bounding box, i.e. the rectangular window 308, predicted by the method with ground truth bounding boxes of objects in the test set. To be considered a correct detection, the area of overlap $\alpha_{ovlp}$ between the predicted bounding box $B_p$ and ground truth bounding box $B_{gt}$ was required to exceed 50% by the formula below as used by M. Everingham in "The 2005 pascal visual object classes challenge", *In Selected Proceedings of the First PASCAL Challenges Workshop*, LNAL, Springer-Verlag, $$\alpha_{avlp} = \frac{\text{area}(B_p \cap B_{gi})}{\text{area}(B_p \cup B_{gi})}$$

D. Performance of People and Vehicle Classifier

To test the performance of the trained classifier for people, the people database set is selected from a well known people database. Pattern Analysis, Statistical Modelling and Computational Learning (PASCAL) database. This people dataset consists of about 800 images and most people in the images are standing or walking. The performance curve of the people classifier without using the stereo cue to generate focus of attention is shown in FIG. 10(*a*). So relatively, every single position of the whole image including people is searched. Some typical results for this classifiers on the these people datasets are shown in FIG. 11*a*-11*f*.

To test the performance of the trained classifier for vehicle, two sets of vehicle datasets are applied. The first one is the University of Illinois at Urbana-Champaign (UIUC) dataset which consists of about 278 images of vehicles in a side-view. An exemplary UIUC dataset is disclosed by S. Agarwal, A. Awan, and D. Roth in "Learning to detect objects in images via a sparse, part-based representation". *IEEE PAMI*, 26(141475-1490. The second one consists of about 600 images selected from PASCAL database and vehicles appear in any poses in the images.

Figure 12A:
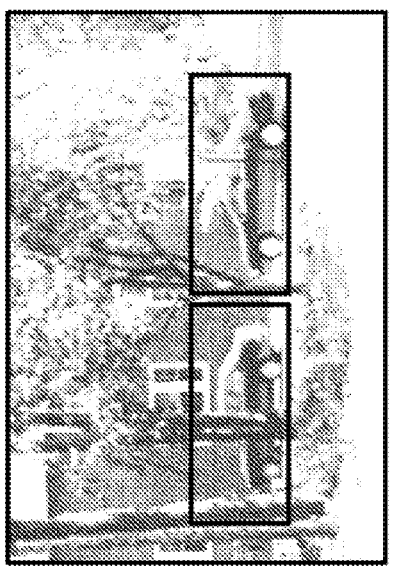
FIG. 12a-12c illustrates vehicle detection results without focus of attention stage from UIUC dataset.
Figure 12B:
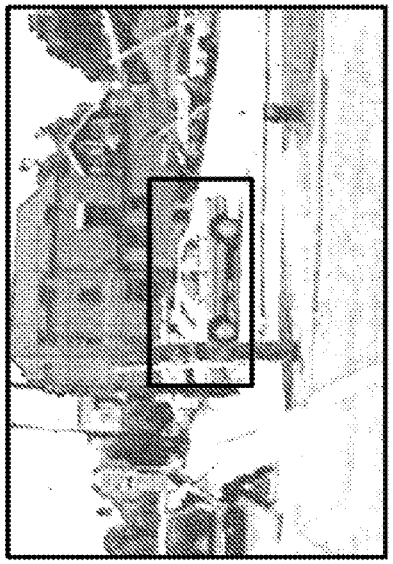
Figure 12C:
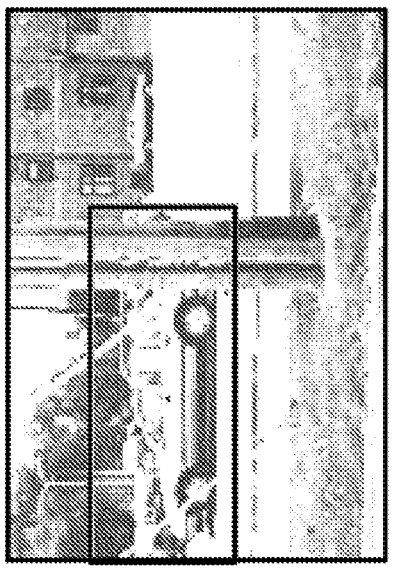
Figure 12D:
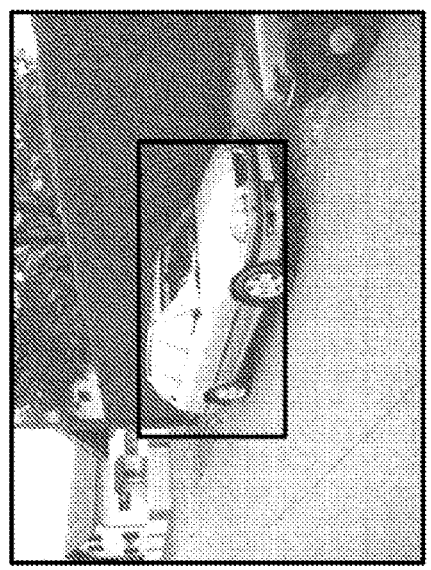
FIG. 12d-12f shows illustrates vehicle detection results without focus of attention stage from PASCAL dataset.
Figure 12E:
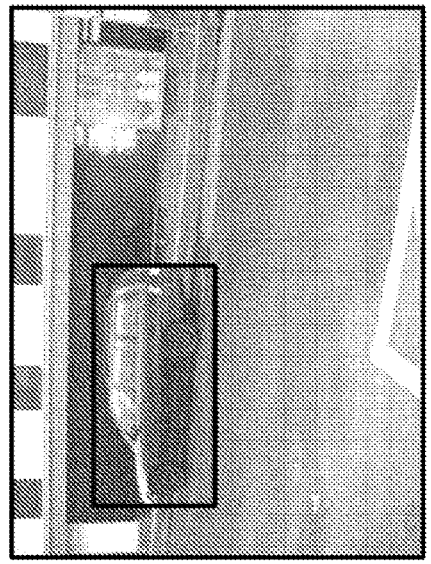
Figure 12F:
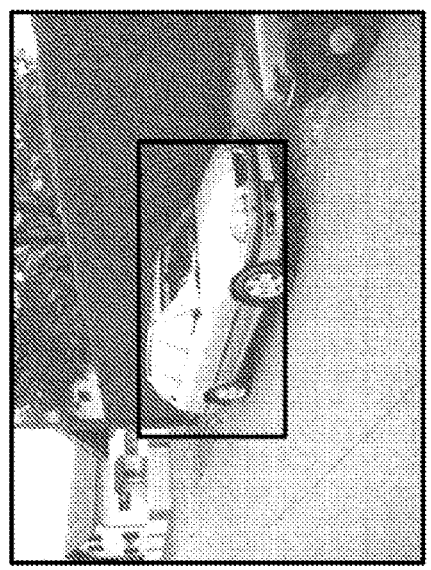

The performance curves of the vehicle classifier on these two datasets without using the stereo cue to generate focus of attention are shown in FIG. 10(*b*) for UIUC dataset and FIG. 10(*c*) for PASCAL dataset. So, relatively, every single position of the whole image including vehicle is searched. Some typical results for this classifier on the two datasets are shown in FIG. 12. FIGS. 12*a*, 12*b* and 12*c* display vehicle detection results without focus of attention on UIUC dataset and FIGS. 12*d*, 12*e* and 12*f* display vehicle detection results without focus of attention on PASCAL dataset. Thus, in all the above testing, the whole image is searched without using any focus of attention.

Figure 10D:
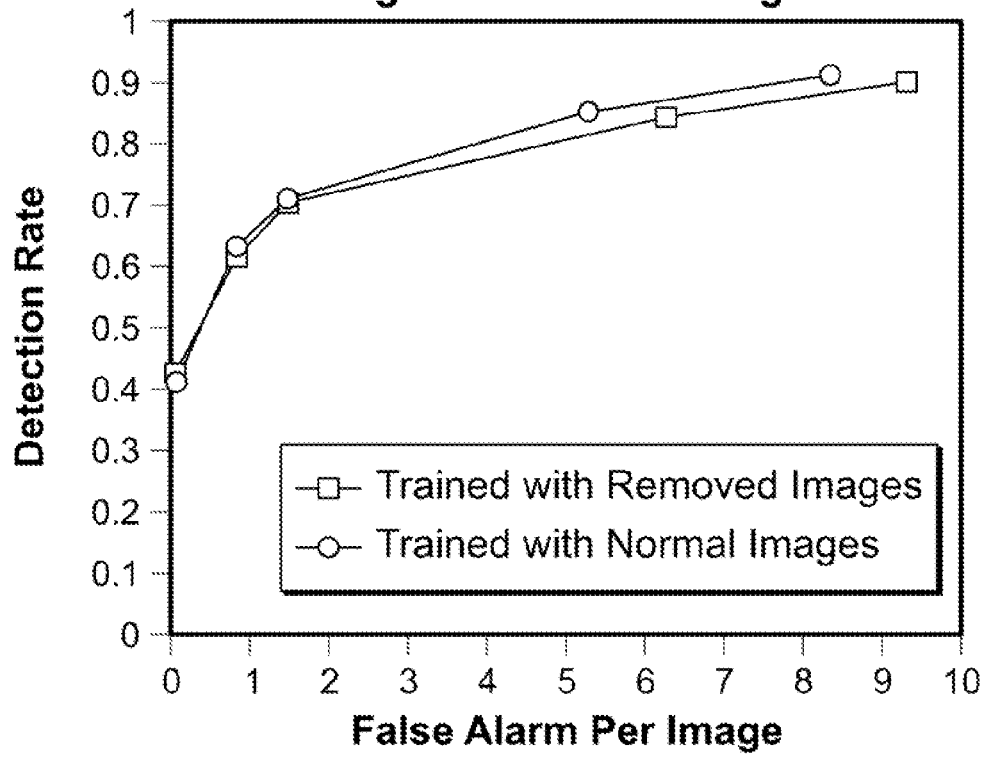
FIG. 10d shows a graphical representation of the performance curve for vehicle detection on selected dataset from PASCAL database with two classifiers using normal vehicle images and rendered vehicle images as training data respectively.
Figure 11A:
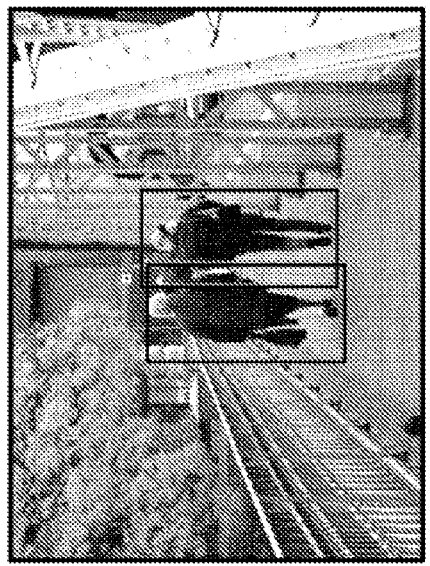
FIG. 11a-11f illustrates people detection results without focus of attention stage.
Figure 11B:
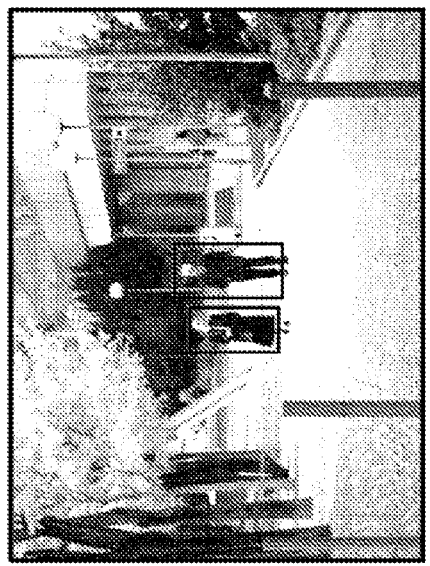
Figure 11C:
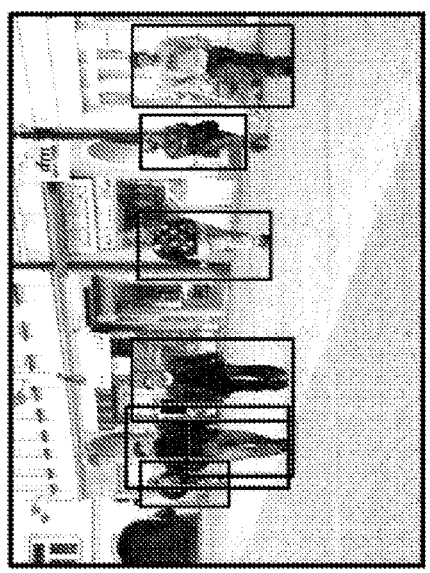
Figure 11D:
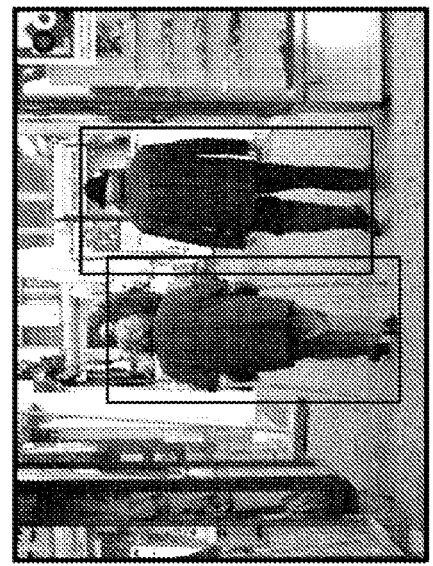
Figure 11E:
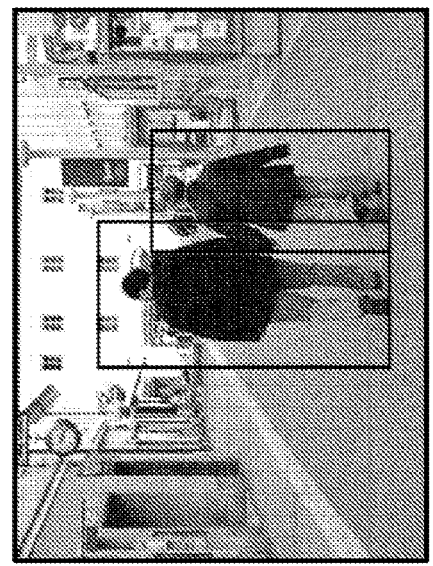
Figure 11F:
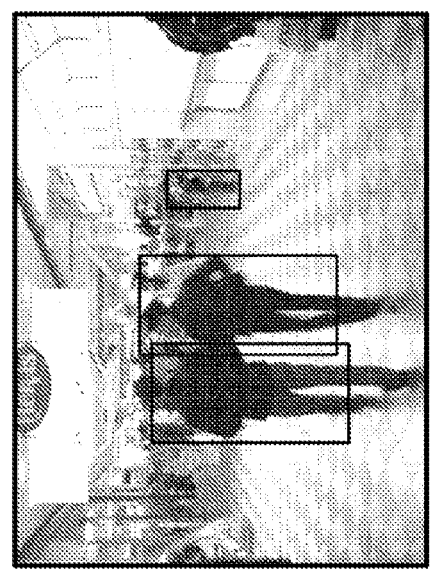

Furthermore, the performance of classifiers using the rendered images as training data is also tested. To do this, the rendered vehicle images as discussed above with reference to FIG. 8 are used to train a vehicle classifier and apply it to the selected PASCAL dataset. The performance curves of this classifier using rendered images (squares in the graph line) and the classifier using normal images (circles in the graph line) as training data are shown in FIG. 10 (*d*) together for comparison. As seen in FIG. 10*d*, the classifier using rendered images as training data can achieve compatible performance.

E. Performance of the Final System

Figure 1:
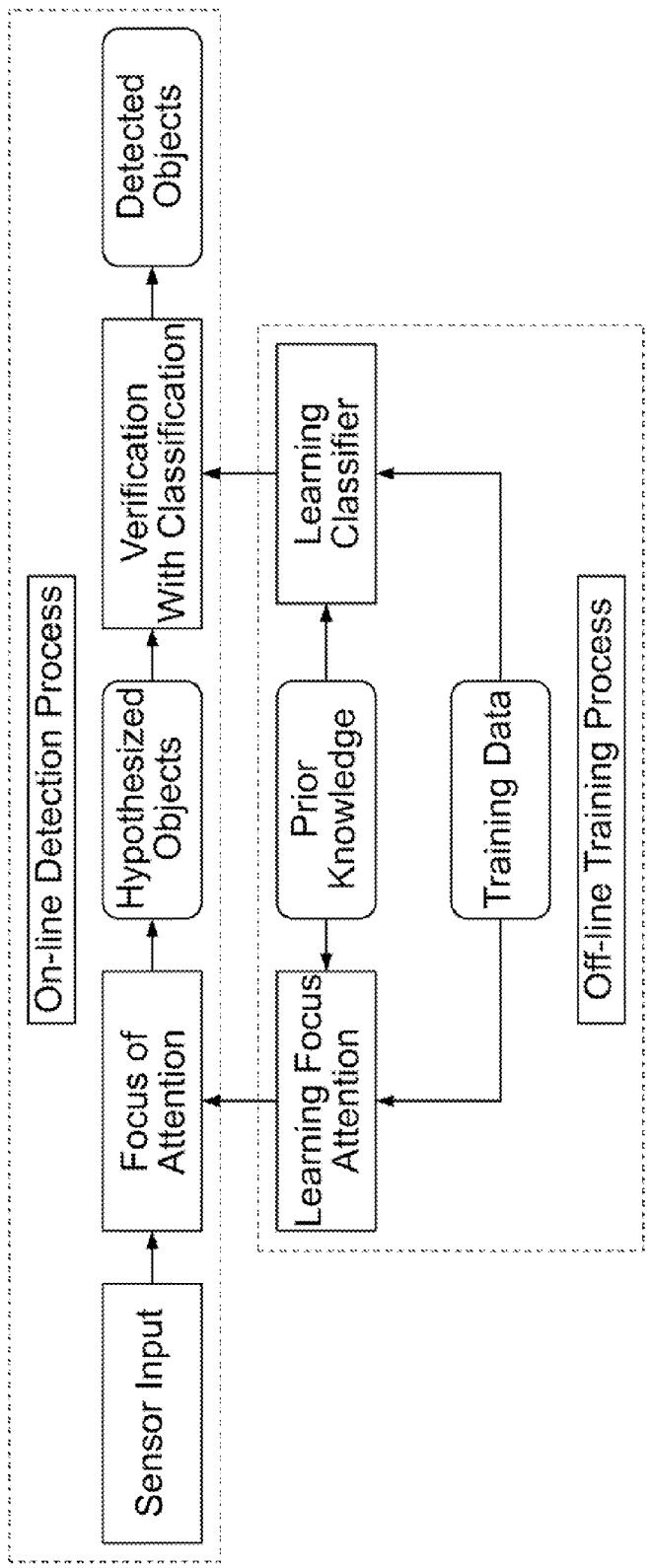
FIG. 1 illustrates a block diagram of the conventional two-stage system for object detection.
Figure 13A:
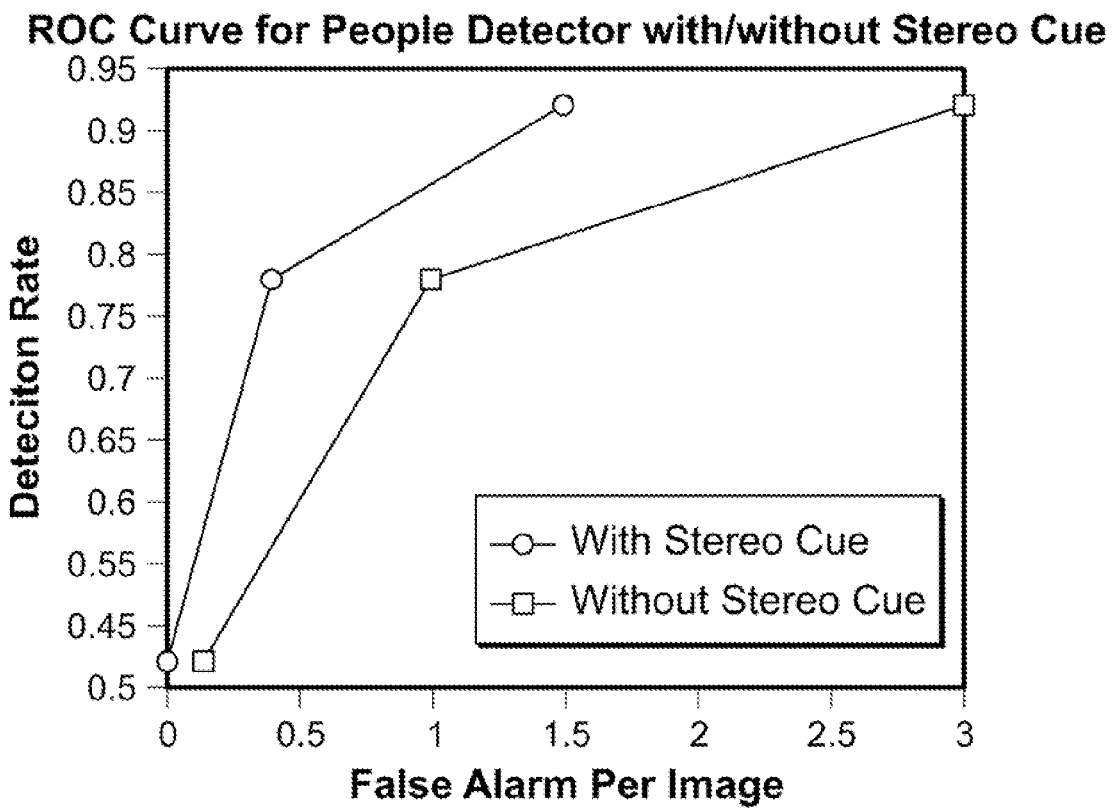
FIG. 13a illustrates graphical representation of the comparison of the performance curves for people detection with and without using stereo cue to generate focus of attention.
Figure 13B:
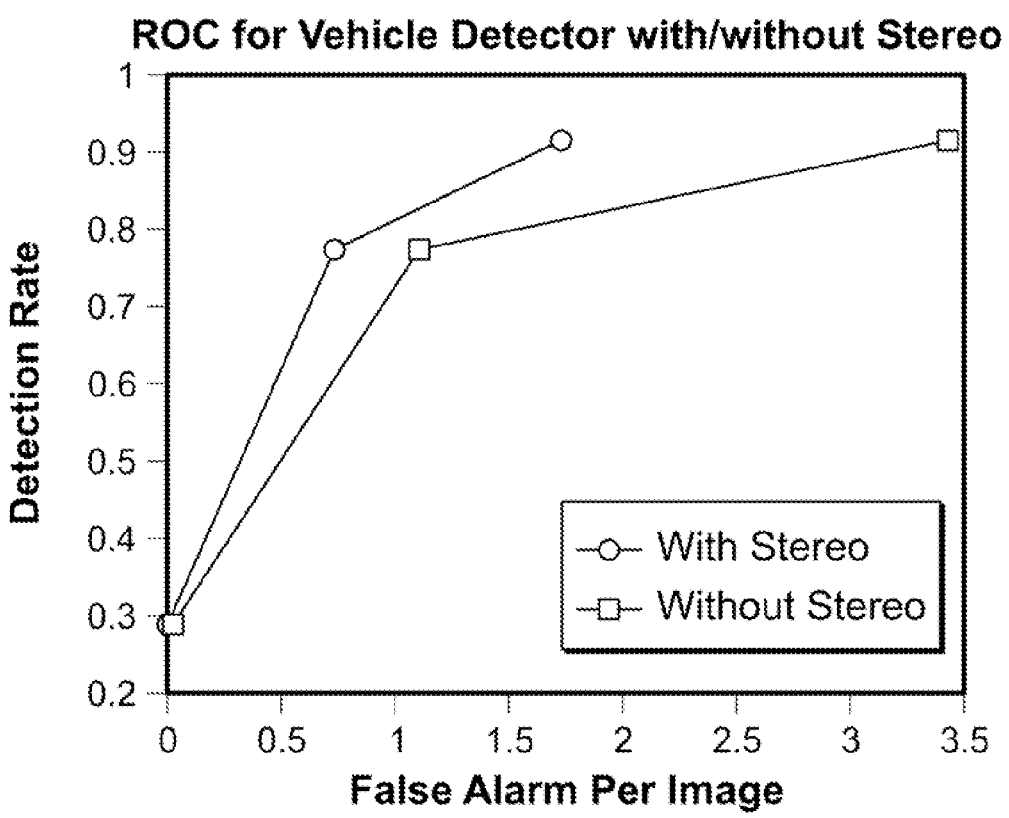
FIG. 13b illustrates graphical representation of the comparison of the performance curves for vehicle detection with and without using stereo cue to generate focus of attention.
Figure 14A:
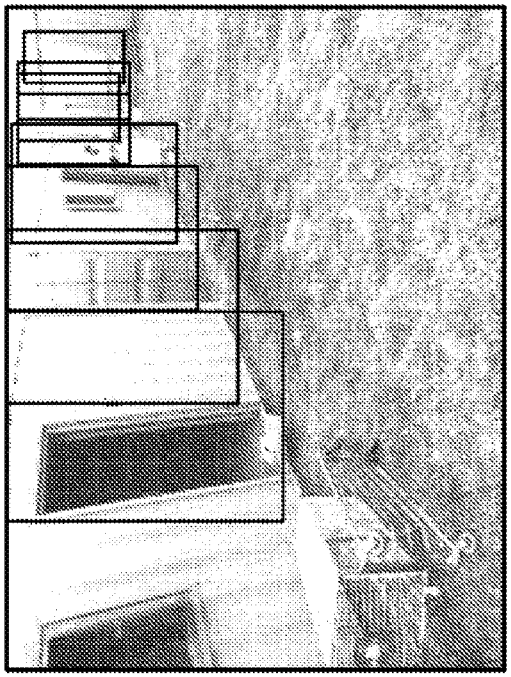
FIG. 14a-14b illustrate some people detection results using stereo cue.
Figure 14B:
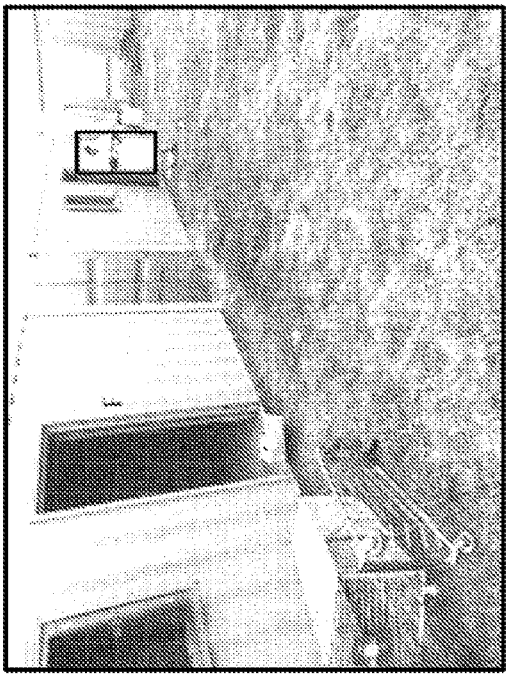
Figure 14C:
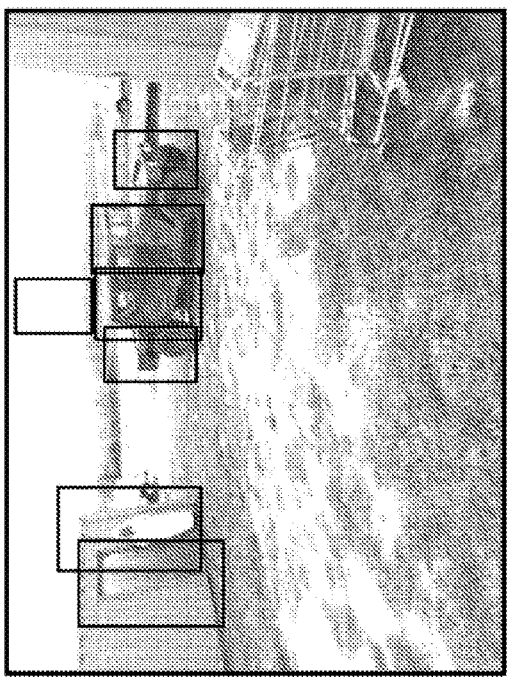
FIG. 14c-14d illustrate final people detection results.
Figure 14D:
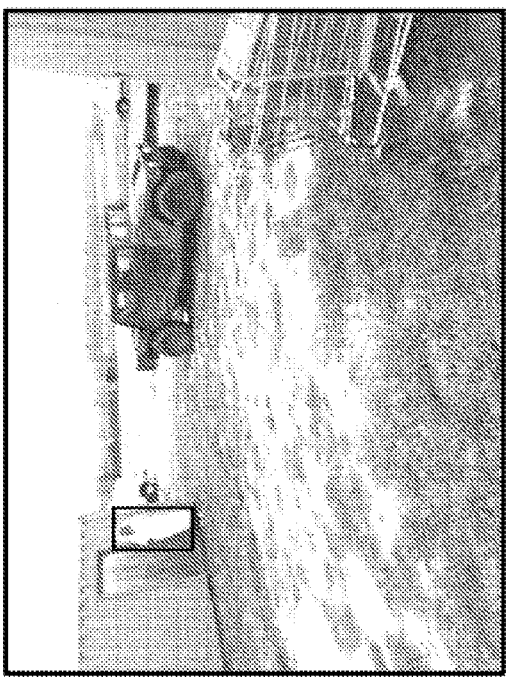
Figure 15B:
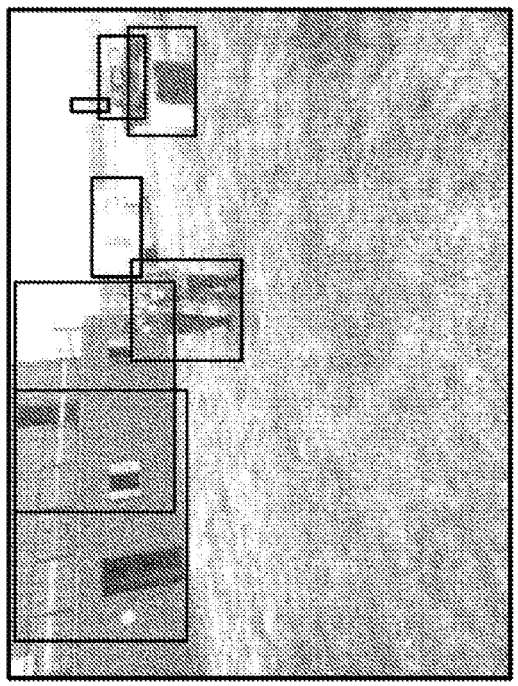
FIG. 15a-15b illustrate some vehicle detection results using stereo cue.
Figure 15D:
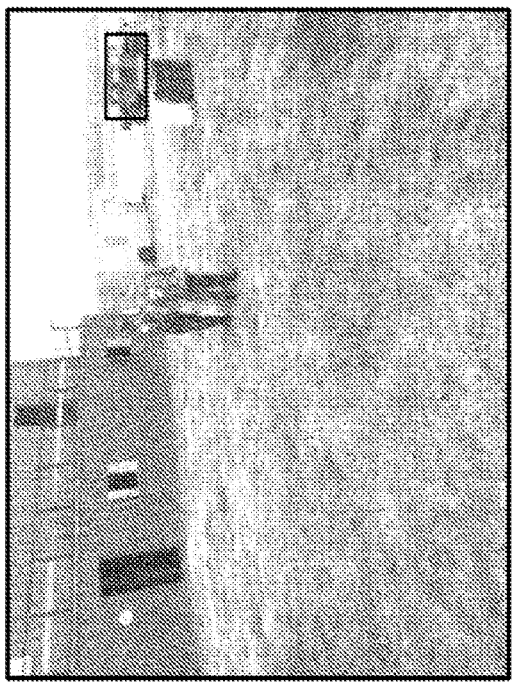
FIG. 15c-15d illustrate final vehicle detection results.
Figure 15A:
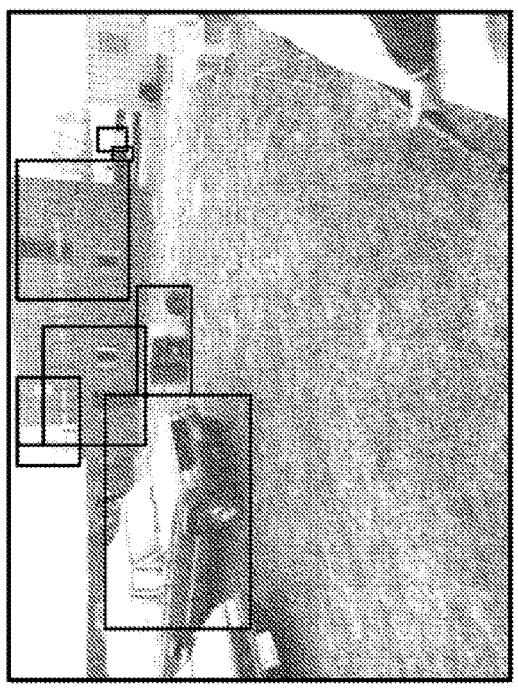
Figure 15C:
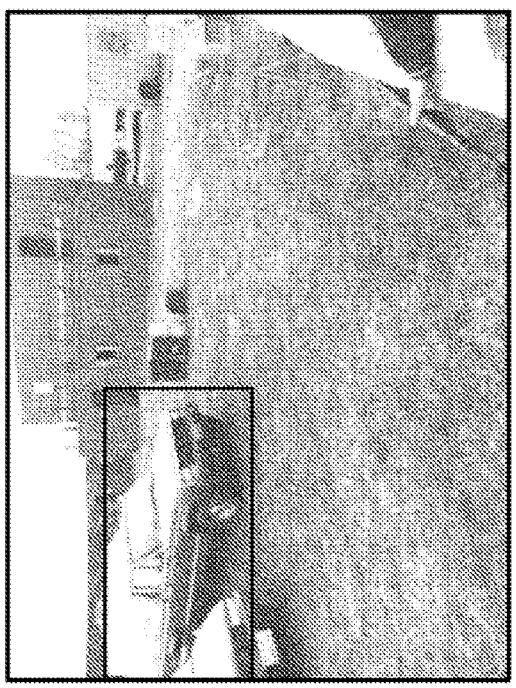

The performance of the system 200 tested by applying preferably about 100 images that contain both still people and vehicles spanning a variety of viewpoints. To show the performance improvement achieved by incorporating the first stage of focus of attention generation by stereo cue, the performance of the system was compared by turning on and off the first stage. In FIG. 13(*a*), the two ROC curves are illustrated. One ROC curve corresponds to turning on, i.e. people detection with using stereo cue to generate focus of attention (the circles in the graph line) and the other ROC curve corresponds to turning off the first stage, i.e. people detection without using stereo cue to generate focus of attention (squares in the graph) in the system for people detection. From these two comparison, one can clearly see that the focus of attention generation stage reduces false alarms significantly. Some typical detection results in this testing for people detection are shown in FIGS. 14*a*-1*d*. As noted by the rectangular windows in FIG. 14*a* and FIG. 14*b*, relatively all the objects in the whole image including the people are detected without incorporating the first stage, i.e. without using the stereo cue to generate focus of attention. Whereas as noted by the rectangular windows in FIG. 14*c* and FIG. 14*d*, finally only the people is detected with incorporating the first stage, thus producing less false alarms.

FIG. 13 (*b*) shows the same case as discussed above for vehicle detection. In FIG. 13 (*b*), the two ROC curves are illustrated. One ROC curve corresponds to turning on, i.e. vehicle detection with using stereo cue to generate focus of attention (the circles in the graph line) and the other ROC curve corresponds to turning off the first stage, i.e. vehicle detection without using stereo cue to generate focus of attention (squares in the graph) in the system for people detection. From these two comparisons, one can clearly see that the focus of attention generation stage reduces false alarms significantly. Some typical detection results in this testing for people detection are shown in FIGS. 15*a*-15*d*. As noted by the rectangular windows in FIG. 14*a* and FIG. 14*b*, relatively all the objects in the whole image including the vehicles are detected without incorporating the first stage, i.e. without using the stereo cue to generate focus of attention. Whereas as noted by the rectangular windows in FIG. 14*c* and FIG. 14*d*, finally only the vehicle is detected with incorporating the first stage, thus producing less false alarms.

Although various embodiments that incorporate the teachings of the present invention have been shown and described in detail herein, those skilled in the art can readily devise many other varied embodiments that still incorporate these teachings without departing from the spirit and the scope of the invention.

The invention claimed is:

1. A method for detecting at least one still target object in at least one image comprising:
   receiving a dataset of training samples in a computer, said training samples including images of still target object;
   selecting regions in the training samples potentially having the still target object;
   computing an extended histogram of oriented gradient (HOG) feature in an image patch of the selected region to generate an angle dimension and a distance dimension of each pixel in said image patch; and
   training at least one classifier based on the computer extended HOG feature to detect the still target object in said image patch.

2. The method of claim 1 wherein said image patch is a rectangular window of pixels.

3. The method of claim 1 further comprising the step of generating position hypothesis of said selected regions, wherein said position hypothesis comprise potential still target object.

4. The method claim 2 wherein said generating step comprises obtaining depth map of the selected regions having the potential still target and calculating a height and density of each pixel of said depth map.

5. The method of claim 3 wherein said distance dimension is measured relative to a center pixel of said image patch.

6. The method of claim 1 wherein said extended HOG feature comprise a 2D orientation histogram displaying a position of the potential target object with respect to the image patch of the selected region.

7. The method of claim 1 wherein each of said classifier is trained according to a specific pose of said potential target objects.

8. The method of claim 1 wherein said classifier is a support vector machine (SVM) classifier.

9. The method of claim 8 wherein said SVM classifier is trained as $$y = \text{sign}\left(\sum_{i=1}^{N} y_i \alpha_i K(x, x_i) + b\right)$$

where x is the extended HOG feature of an observation example, $y \in \{+1, -1\}$ is a class label, $x_i$ is the extended HOG feature of $i^{th}$ training sample, N is the number of the training samples, and $k(x,x_i)$ is the kernel function.

10. The method of claim 1 wherein said images are rendered images.

11. The method of claim 1 wherein said images are non-rendered images.

12. A computer program product comprising a non-transitory computer readable storage medium having a computer program stored thereon for performing the method of claim 1.

* * * * *